United States Patent [19]

Abbratozzato et al.

[11] Patent Number: 4,682,066
[45] Date of Patent: Jul. 21, 1987

[54] ALIGNMENT SYSTEM FOR PERMANENT MAGNET MOTORS

[75] Inventors: Salvatore R. Abbratozzato, Timonium; Richard T. Walter, Baldwin; Dale K. Wheeler, Fallston, all of Md.

[73] Assignee: Black & Decker Inc., Newark, Del.

[21] Appl. No.: 796,928

[22] Filed: Nov. 12, 1985

[51] Int. Cl.[4] .................. H02K 21/28; H02K 5/02
[52] U.S. Cl. ........................... 310/154; 29/446; 29/596; 310/50; 310/89
[58] Field of Search ............ 24/17 A, 20 EE, 23 EE; 29/446, 450, 596; 310/42, 43, 47, 40 MM, 50, 154, 89

[56] References Cited

U.S. PATENT DOCUMENTS

| | | |
|---|---|---|
| 2,878,802 | 4/1975 | Schmitt et al. |
| 3,023,332 | 2/1962 | St. Charles ............ 310/42 |
| 3,165,654 | 1/1965 | Mabuchi |
| 3,234,417 | 2/1966 | Somers et al. |
| 3,401,281 | 9/1968 | Martin et al. |
| 3,422,295 | 1/1969 | Parker |
| 3,445,693 | 5/1969 | Crawshaw et al. ............ 310/89 |
| 3,489,937 | 1/1970 | Maher et al. |
| 3,500,090 | 3/1970 | Baermann |
| 3,875,436 | 4/1975 | MacFarland ............ 310/50 |
| 3,878,802 | 4/1975 | Schmitt et al. |
| 4,071,794 | 1/1978 | Schoen |
| 4,074,159 | 2/1978 | Robison ............ 310/89 |
| 4,125,791 | 11/1978 | Futterer |
| 4,335,323 | 6/1982 | Kebbon et al. ............ 310/154 |
| 4,467,231 | 8/1984 | Biglino ............ 310/154 |
| 4,505,031 | 3/1985 | Colwell et al. ............ 29/596 |

FOREIGN PATENT DOCUMENTS 180771  6/1922  United Kingdom .

Primary Examiner—Patrick R. Salce
Assistant Examiner—D. L. Rebsch
Attorney, Agent, or Firm—Charles E. Yocum; Dennis A. Dearing; Edward D. Murphy

[57] ABSTRACT

A permanent magnet motor for use in such electrically-powered devices as appliances, power tools, and the like includes a longitudinally-split cylindrical ferromagnetic wrapper having an inner diameter normally less in its free state than the outer cross-sectional dimension of a permanent magnet array. During assembly of the motor, the split wrapper is expanded to fit around the magnet array, and then is allowed to contract, to urge the magnet array radially inwardly against cooperating surfaces formed on each of two end caps. This maintains a predetermined orientation or alignment of the magnet array relative to the armature, including, for example, a predetermined air gap between the magnet array and the armature. Accordingly, the conventional requirement for such additional retention mechanisms as spring clips, adhesives, fasteners, and the like, is eliminated. The split wrapper also automatically aligns the respective bore axes of the end caps with respect to each other and with respect to an armature axis, regardless of any pre-existing axial misalignment of the edges defining the split in the wrapper. This automatic alignment enhances the lives of bearings mounted in the end cap bores. Another feature is the use of multi-function, unitary end caps, namely those which not only contain motor element alignment features, but also one or more integral electrical and mechanical connection features.

14 Claims, 23 Drawing Figures

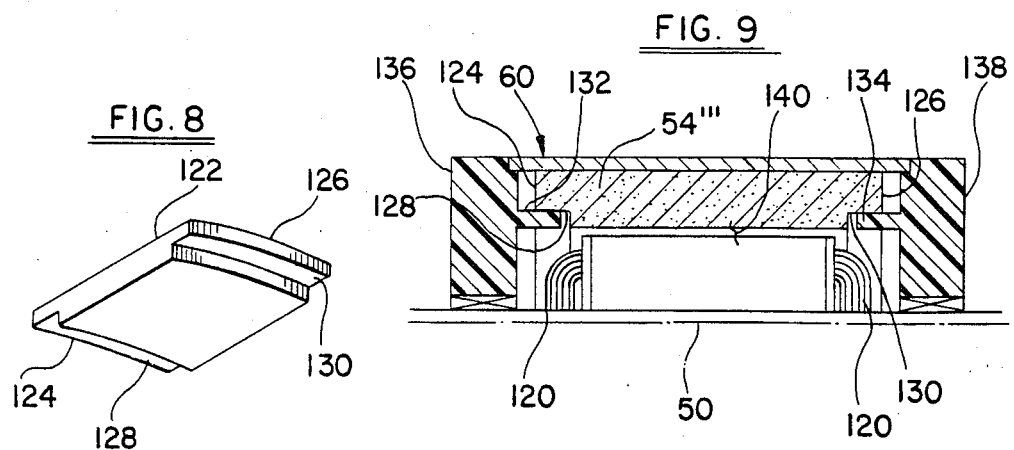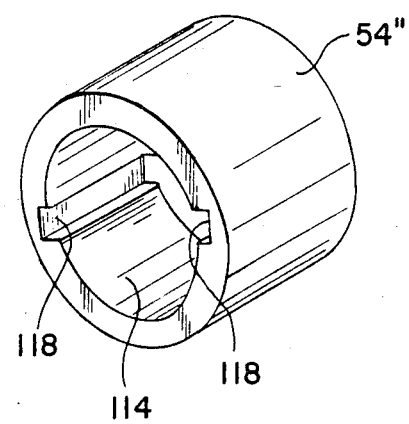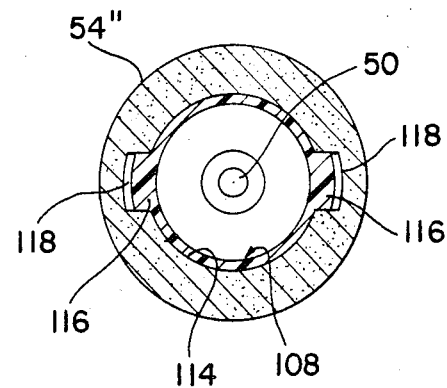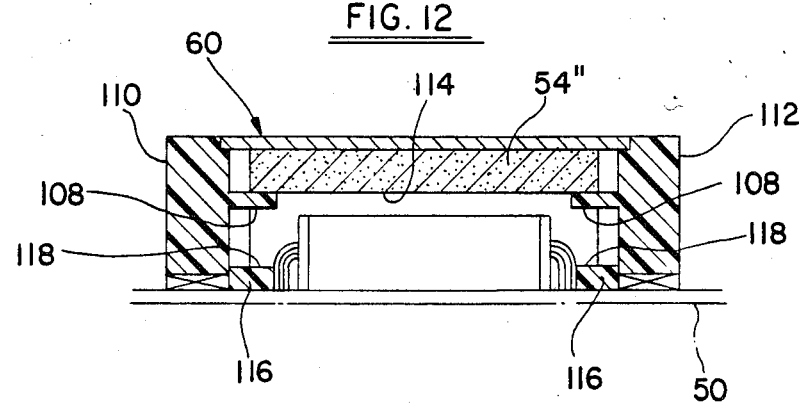

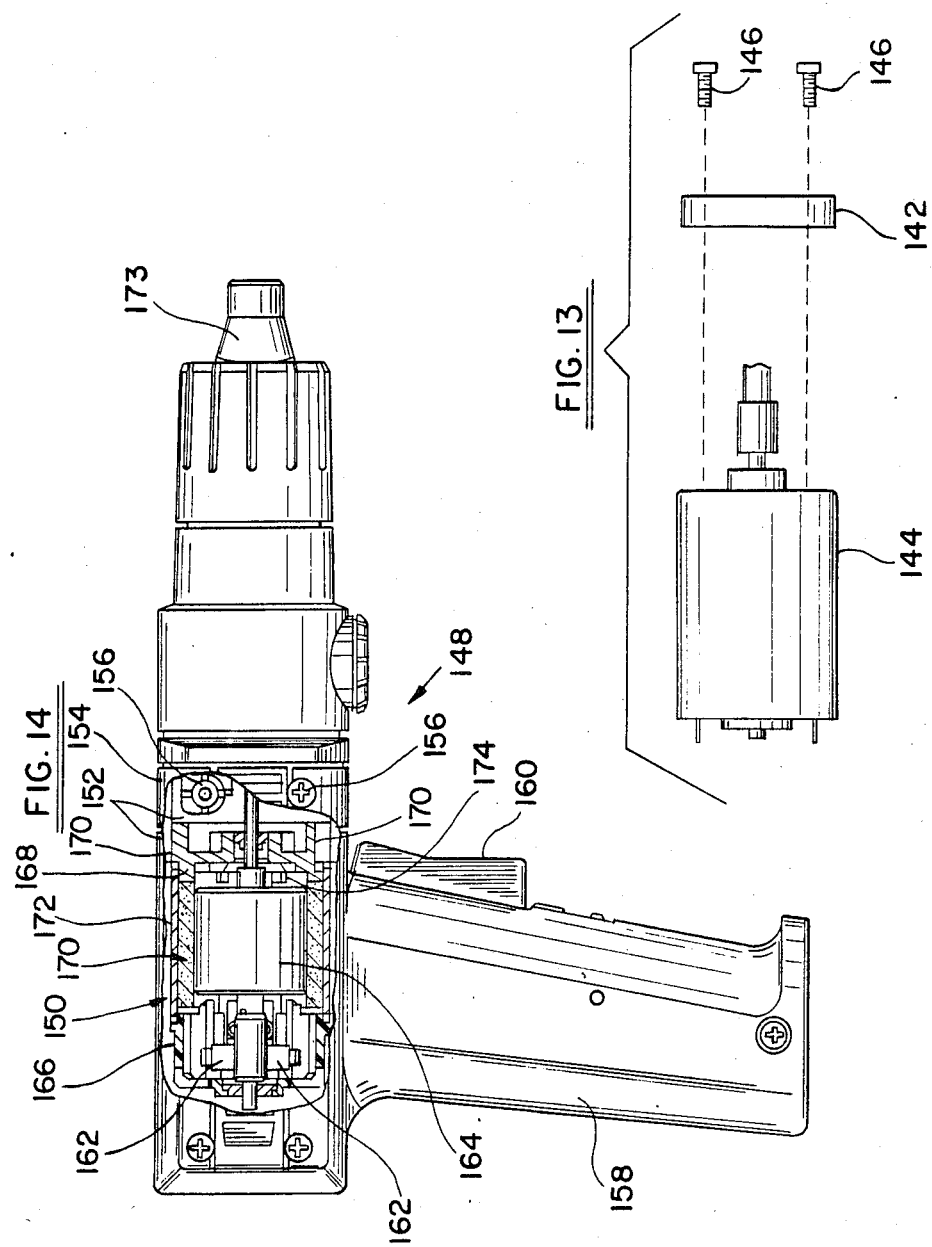

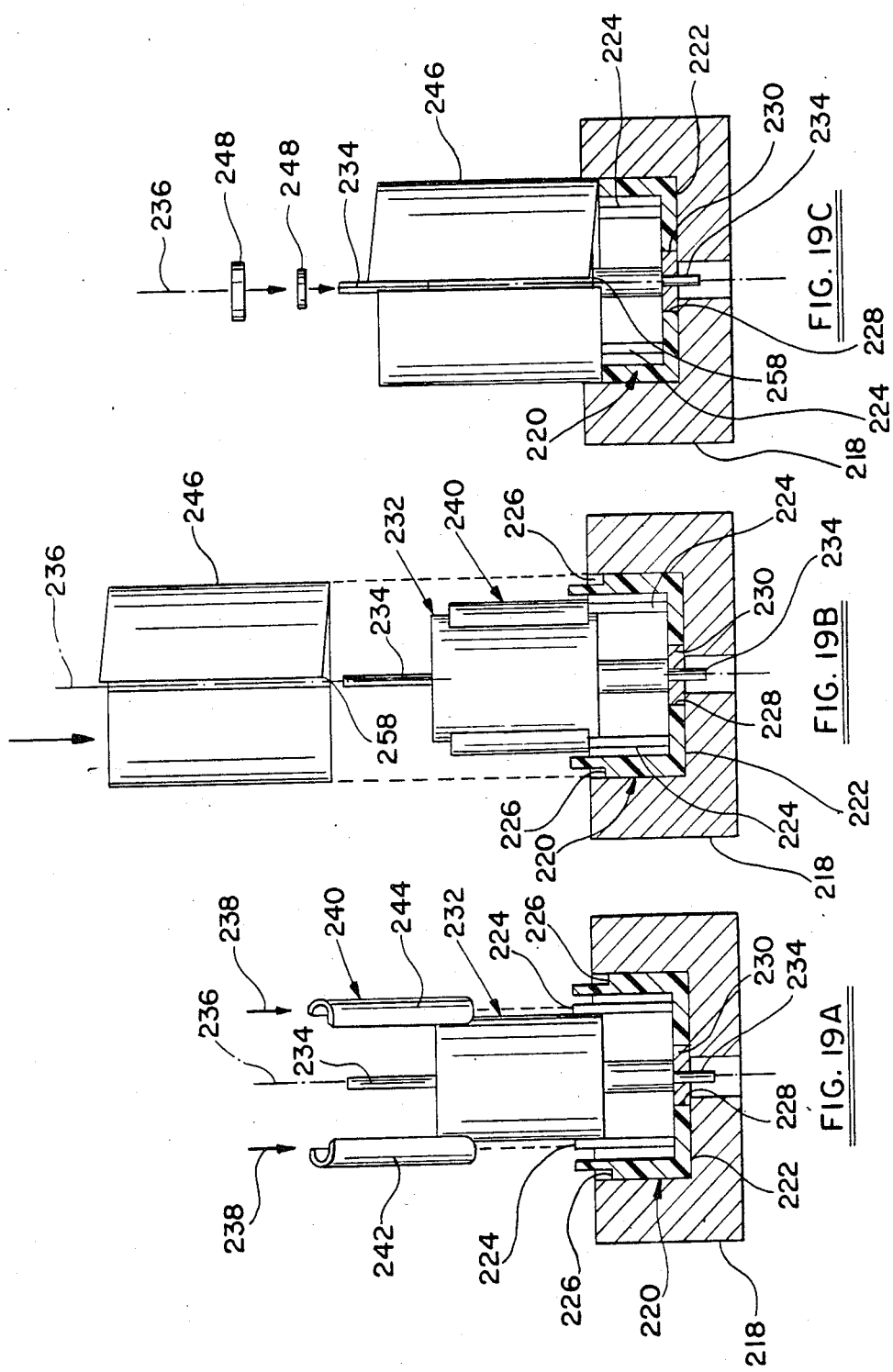

ALIGNMENT SYSTEM FOR PERMANENT MAGNET MOTORS

FIELD OF THE INVENTION

This invention relates to the structure of permanent magnet motors for use in electrically-powered devices, and more particularly to a system for maintaining a predetermined orientation of the respective elements of permanent magnet motors used in such devices as appliances, power tools and the like.

BACKGROUND OF THE INVENTION

The alignment or orientation of the various elements of a permanent magnet motor relative to each other, and especially with respect to the armature axis, becomes more and more important as such motors become more compact to match the configurations of household appliances, cordless portable power tools and other battery-powered products for home, vehicle and industrial use. Even relatively slight misalignment of the components can take its toll on such mechanical elements as motor bearings and drive members, which action can ultimately cut short the motor's useful life. Alignment is also critical to electrical parameters which affect the motor's efficiency. One of the major factors contributing to misalignment occurs as a result of the accumulation of variations in manufacturing tolerances in such elements as the end caps which rotatably support the armature, the permanent magnet array itself, and the ferromagnetic wrapper enclosing the magnet array and armature.

One approach to the problem has been to draw sheet metal into the shape of a single, closed-end cylindrical "can", which combines an end cap and the wrapper into a unitary structure. Here, the magnet elements are aligned relative to each other and to the armature by using the can and/or an outer surface of the end caps as reference surfaces. One resulting disadvantage is that additional alignment mechanisms, such as spring clips, tabs formed in the can inner surface, or adhesives, are required to maintain the predetermined orientation of the permanent magnets. This causes added manufacturing costs, either in parts or assembly time, or both. Another disadvantage directly attributable to locating the magnets using the can as a reference surface is that the "stack-up" (or accumulation) of variations in manufacturing tolerances is directed radially inwardly toward the armature. Consequently the air gap between the radially inner surfaces of a particular permanent magnet array and the armature will fluctuate with the tolerance stack-up, from a predetermined minimum to an excessive maximum. This means that many such motors will have more air gap than appropriate, and will suffer reduced efficiency. For battery-powered products, this is a significant problem.

Another disadvantage of this approach, as well as of any other system where the exterior configuration of the end caps is fixed, is that the electrically-powered device must to some extent be designed around the motor. This often requires, for example, that a motor having a fixed end cap configuration must be connected to the housing of the device using a separate mounting bracket and concomitant fasteners, all configured to match the shape of the end caps. Of course, tolerance stack-up can be minimized by using motor elements manufactured within very tight tolerances. On the other hand, forming ceramic or plastic permanent magnet segments within such tolerances will likewise result in higher manufacturing costs.

Another approach has been to form the wrapper into an open-ended tube using two discrete end caps, and to locate the permanent magnet segments on their respective inner surfaces using structural features formed on the end caps. This establishes the desired air gap, but the use of a wrapper having a fixed cross-sectional dimension still requires the use of additional elements to maintain the magnet orientation, including one or more of the following: spring clips, adhesives, tabs formed in the wrapper, or forming the wrapper into a particular polygonal cross-sectional configuration. Also, a characteristic of an open-ended wrapper constructed by forming a rectangular strip of metal into a cylinder is that often the parallel longitudinal edges of the rectangle become axially misaligned after forming. Here, even a relatively slight axial misalignment becomes important when the end caps are assembled to the wrapper, in that the end caps are skewed away from planes normal to the armature axis when they engage the misaligned edges. Consequently, the end cap bearing axes are skewed relative to the armature axis, and degradation of the end cap bearings is accelerated.

The increasing demand for permanent magnet motors magnifies the cost penalties associated with the above-noted solutions. The advent of the present invention provides a permanent magnet motor in which such costs have been taken out, while so enhancing the alignment of the respective motor elements as to extend motor life and improve motor efficiency.

SUMMARY OF THE INVENTION

The permanent magnet motor of the present invention has several attributes which result in reduced cost and improved efficiency. First, it eliminates the need for supplemental elements to maintain the orientation of the permanent magnet array, by combining the features of a spring and the wrapper into a unitary, open-ended split cylinder which biases the magnet array into engagement with cooperating surfaces formed on the end caps. Second, the non-fixed diameter of the split wrapper of the present invention permits the tolerance stack-up to be accommodated, or taken up, radially outwardly, thereby freeing the end caps to assume any desired configuration. Third, it automatically establishes coaxial alignment of the end cap bore axes, because sandwiching a split tubular wrapper, formed of a rectangular sheet of ferromagnetic material, between two parallel surfaces normal to the axes automatically squares the respective ends of the tube, eliminating the axial misalignment problem.

Accordingly, it is an object of the present invention to provide a permanent magnet motor for an electrically-powered device, in which the motor includes means, operatively associated with two end caps defining respective end cap bores, for maintaining a predetermined orientation of a permanent magnet array, which means include spring means connecting the end caps for biasing the permanent magnet array against cooperating surfaces formed on the end caps.

It is a further object of the present invention in which said orientation is maintained by maintaining a predetermined air gap between the permanent magnet array and an armature, and optionally by maintaining a predetermined circumferential orientation of the permanent magnet array relative to the end caps.

It is another object of the present invention to provide the motor with means for accommodating variations in manufacturing tolerances in the motor elements, while simultaneously maintaining the permanent magnet array in its predetermined orientation.

It is yet another object of the present invention to provide means operatively associated with the end caps and with a wrapper for aligning and maintaining the end cap bore axes coaxial with each other and with the armature axis.

It is also an object of the present invention to accomplish all of the above-noted objects by providing the spring means in the form of a one-piece longitudinally-split cylindrical ferromagnetic wrapper having an inner diameter normally less in its free state than the cross-sectional dimension of the permanent magnet array.

An additional object further includes providing electrically-powered devices embodying one or more of all of the preceding features. In this respect, it is an object of the present invention to embody such features in an electrically-powered device having first connection means for connecting the permanent magnet motor to a source of electrical energy and second connection means for connecting the permanent magnet motor to a housing member, wherein at least one of the motor end caps is formed as a unitary structure integral with at least one of the first and second connection means, and wherein the motor includes spring means for maintaining a predetermined orientation of the end cap and permanent magnet array relative to the armature.

A further object of the present invention includes providing a process for assembling a permanent magnet motor which includes the steps of expanding the split wrapper until it can be placed around the permanent magnet array, and allowing the split wrapper to contract to urge the permanent magnet array against cooperating surfaces formed on an end cap subassembly, thereby maintaining a predetermined orientation of the permanent magnet array relative to the end cap subassembly. In addition, it is an object of the present invention to provide a process for assembling a permanent magnet motor which includes the steps of placing one end of a split ferromagnetic cylinder against a first end cap defining a bore, placing a second end cap defining a bore adjacent the other end of the cylinder, and closing the distance between the end caps until the cylinder longitudinal edges are in axial alignment, thereby coaxially aligning the end cap bores.

Other objects, features and advantages of the present invention will become more fully apparent from the following detailed description of the preferred embodiments, appended claims and accompanying drawings.

BRIEF DESCRIPTION OF THE DRAWINGS

In the accompanying drawings:

FIG. 8 is a detail perspective view of a permanent magnet segment of another embodiment of the present invention, in which recesses are formed axially inwardly of the magnet and faces.

FIG. 9 is a schematic side elevational sectional detail view of the permanent magnet motor of the embodiment of the present invention shown in FIG. 8, and showing axial protrusions formed on the end caps engaging cooperating recesses formed in the permanent magnet segments.

FIG. 10 is a detail perspective view of a one-piece permanent magnet array of yet another embodiment of the permanent magnet motor of the present invention, in which recesses are formed in an inner surface of the array.

FIG. 11 is a schematic cross-sectional elevational detail view of the coaction of end cap protrusions with the recesses formed in the permanent magnet array of the embodiment of the present invention shown in FIG. 10.

FIG. 12 is a schematic side elevational sectional detail view of the embodiment of the present invention shown in FIGS. 10 and 11.

FIG. 13 is a schematic elevational detail view of a permanent magnet motor having a drawn-can wrapper, in which a separate mounting bracket and fasteners are required for connecting the motor to an electrically-powered device.

FIG. 14 is a side elevational view, partially cut away, of another electrically-powered device, namely a cordless drill-driver, embodying still another embodiment of the permanent magnet of the present invention, in which the pinion end cap is formed as a unitary structure integral with means for connecting the permanent magnet motor to a power tool housing member, and in which the commutator end cap is formed as a unitary structure integral with means for connecting the permanent magnet motor to a source of electrical energy.

FIGS. 19A–19E are schematic sequential elevational views, partly in section, of the steps of assembling the permanent magnet motor of the present invention, with some elements removed for clarity, in which:

FIG. 19A shows the step of locating a permanent magnet array against cooperating surfaces formed on the commutator end cap subassembly, which is located in a holding fixture;

FIG. 19B shows the step of placing an expanded split wrapper around the permanent magnet array and against the end cap subassembly;

FIG. 19C shows the steps of adding one or more washers to control "end play" in the motor, after the split wrapper has contracted around the motor;

FIG. 19D shows the steps of journaling the pinion end cap subassembly on the armature shaft and closing the distance between the commutator and pinion end cap subassemblies so that the wrapper expands to engage a cooperating surface formed on the pinion end cap subassembly while still maintaining a predetermined orientation of the permanent magnet array relative to the commutator end cap subassembly; and FIG. 19E shows the step of using a magnetizing coil to magnetize such motor elements as the permanent magnet array.

DETAILED DESCRIPTION OF THE PREFERRED EMBODIMENTS

Figure 1:
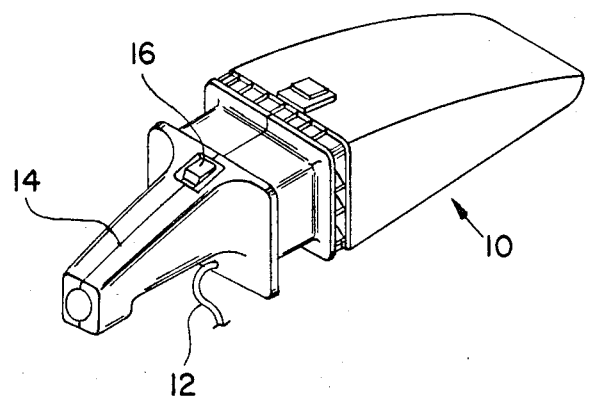
FIG. 1 is a perspective view of an electrically-powered device, for example a hand-held portable vacuum cleaner, embodying the permanent magnet motor of the present invention.
Figure 2:
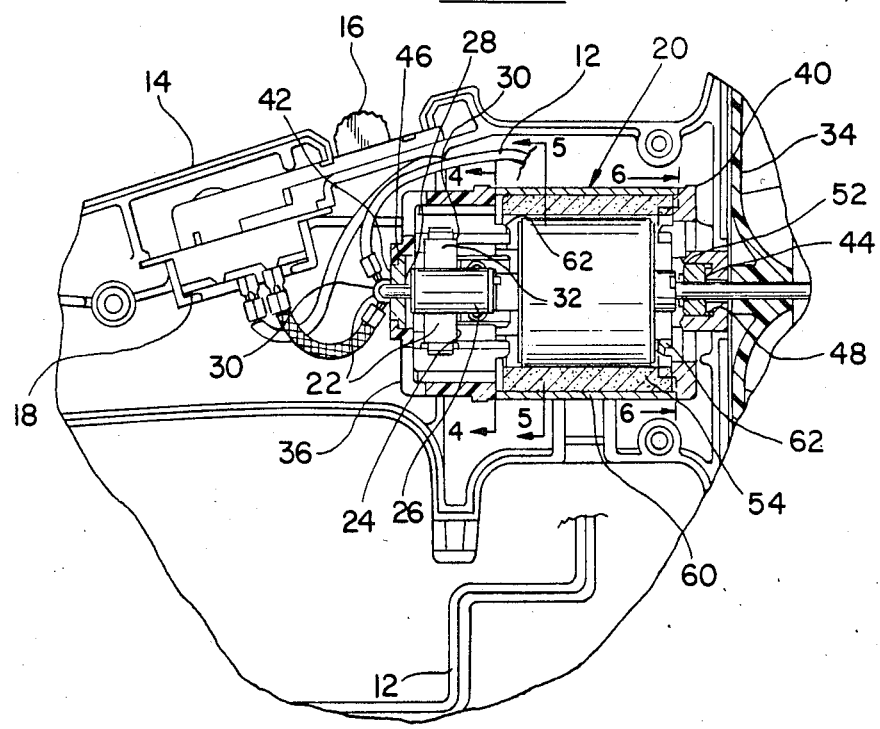
FIG. 2 is an enlarged side elevational detail view, partly in section of the portable vacuum cleaner shown in FIG. 1, showing one embodiment of the permanent magnet motor of the present invention.

As shown in FIG. 1, an electrically-powered device having a permanent magnet motor of the present invention is shown as a hand-held portable vacuum cleaner and is referred to generally as 10. This vacuum cleaner is a battery-powered appliance powered by a conventional 12-volt vehicle battery through a cigarette lighter plug conductors 12, which enter the vac at a handle 14. A slide button 16 actuates a switch 18, which, as shown in FIG. 2, selectively interrupts current flowing in cigarette lighter plug conductors 12. The switch 18 is electrically connected to a permanent magnet motor 20 of the present invention at brush contact 22, which holds a brush 24 into operative engagement with a commutator 26 mounted on an armature shaft 28. Similarly, one of the cigarette lighter plug conductors 12 is connected to motor 20 at another brush contact 30, which holds a brush 32 into operative engagement with the commutator 26. When switch 18 is actuated, the motor 20 rotates an impeller 34, which creates the desired vacuum.

Figure 3:
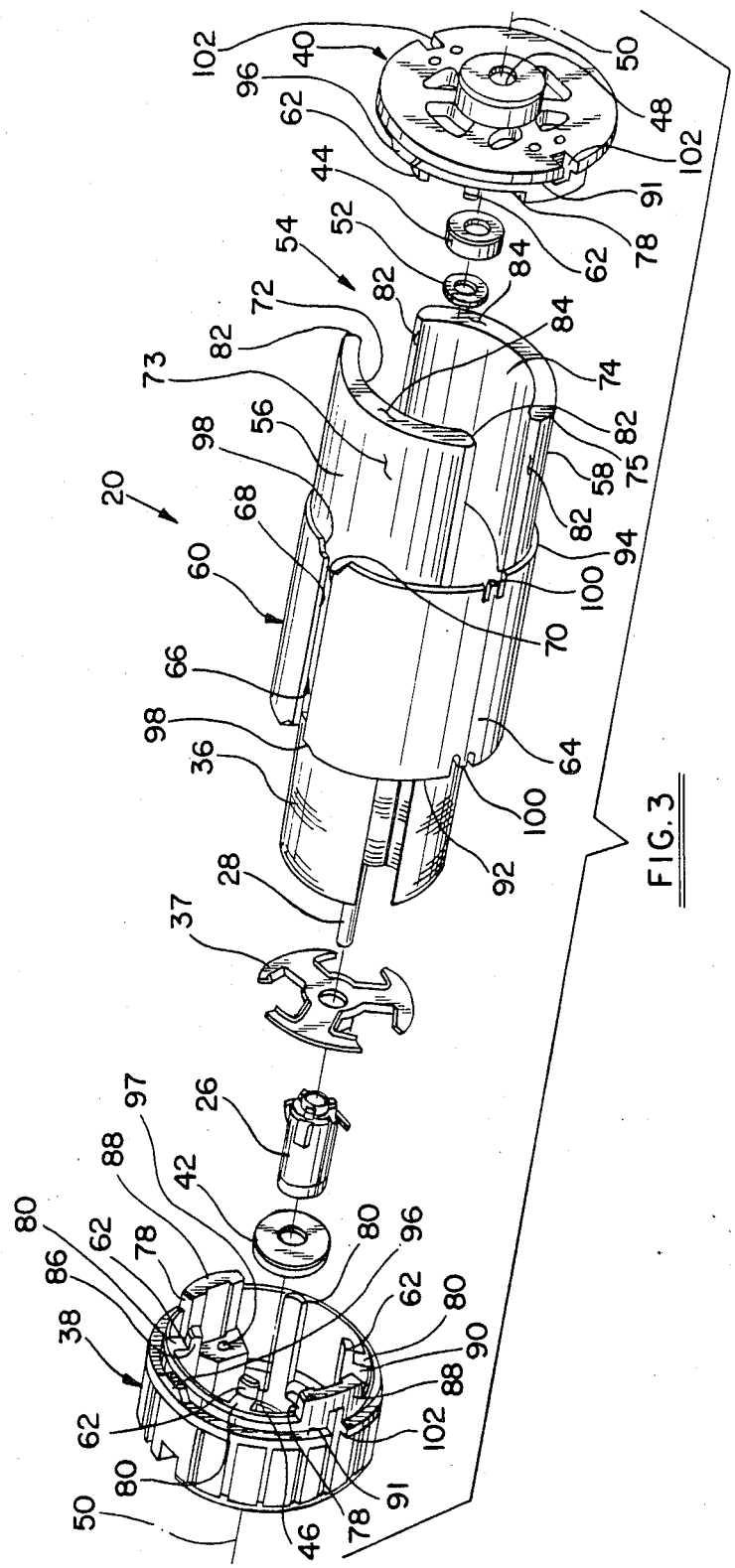
FIG. 3 is an exploded perspective view of the embodiment shown in FIG. 2 of the permanent magnet motor of the present invention, with some elements, such as the brush rigging, omitted for clarity.

The structure of the permanent magnet motor 20 of the present invention is shown in FIG. 2, and in more detail in FIG. 3. In addition to the electrical connection elements previously described, the motor 20 includes an armature 36 having end fibers 37 mounted on the armature shaft 28, which is rotatably journaled in a commutator end cap 38 and a pinion end cap 40 via end cap bearings 42, 44 mounted in respective end cap bores 46, 48. The armature 36 is coaxially aligned with the end cap bores 46, 48 along an armature axis 50, and one or more washers 52 are mounted on the shaft 28 adjacent the pinion end cap 40. A permanent magnet array 54, in this embodiment shown as being defined by two arcuate permanent magnet elements or segments 56, 58, is disposed about the armature 36 in a predetermined orientation. Inasmuch as the present invention may be embodied in permanent magnet motors having "n" number of poles, it will be appreciated that the number of permanent magnet elements can vary, as can the respective orientations of the magnet arrays, without varying from the scope of the present invention.

Means operatively associated with end caps 38, 40 for maintaining the permanent magnet array 54 in its predetermined orientation are shown in detail in FIGS. 3–6. Such means include spring means 60 connecting the end caps 38, 40 for biasing the permanent magnet array 54 radially inwardly against cooperating radial orientation surfaces 62 formed on the end caps 38, 40. In the illustrated embodiments, spring means 60 include a one-piece wrapper 64 formed of a rectangle of stamped ferromagnetic material having a high degree of perpendicularity, and further having a longitudinal split 66 defined by two opposing parallel edges 68, 70 of the rectangle. The wrapper 64 is formed into a tube having an inner cross-sectional dimension normally less in its free state than the cross-sectional dimension of the magnet array 54. As a result, in the embodiment shown in FIGS. 3–6, in which the wrapper 64 is formed into a split cylinder and the magnet array 54 is defined by arcuate segments 56, 58, the inner diameter of the wrapper 64 is normally less in its free state than the outer diameter of the magnet array 54, thereby urging inner surfaces 72, 74 of the respective magnet segments 56, 58 into engagement with the cooperating end cap radial orientation surfaces 62.

Figure 4:
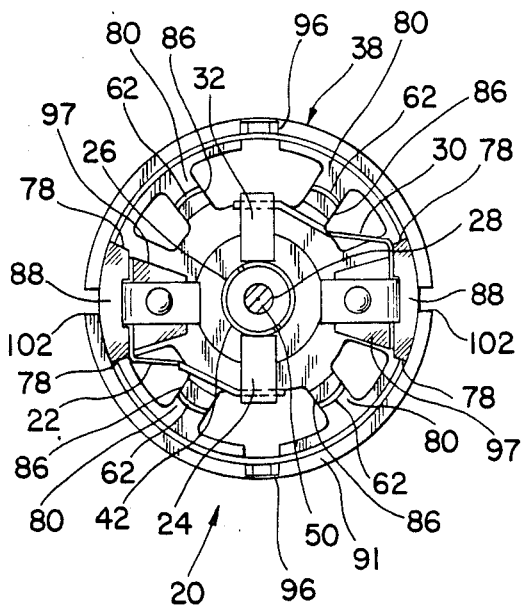
FIG. 4 is an elevational cross-sectional detail view of the permanent magnet motor of the present invention, taken along line 4—4 of FIG. 2, and showing the commutator end cap subassembly.
Figure 5:
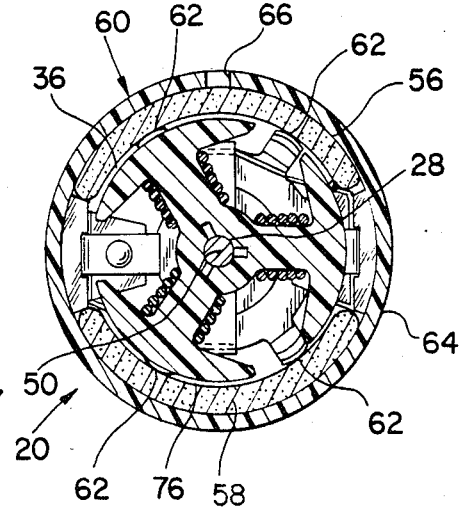
FIG. 5 is an elevational sectional detail view of the permanent magnet motor of the present invention, taken along line 5—5 of FIG. 2, and showing the coaction of the split wrapper with a multi-segment permanent magnet array and with commutator end cap surfaces.

Referring to FIGS. 4 and 5, these radial end cap surfaces 62 are formed on the end caps 38, 40 at predetermined distances from armature (and end cap bore) axis 50, thereby establishing a desired predetermined air gap 76 between the armature 36 and permanent magnet array 54. The biasing action of wrapper 64 maintains this orientation, while simultaneously accommodating variations in manufacturing tolerances in the magnet segments 56, 58, end caps 38, 40 and wrapper 64. This is made possible by split 66, which permits the wrapper to vary slightly in its diameter, thereby taking up the "stack-up" in tolerances radially outwardly, while still exerting biasing force radially inwardly sufficient to maintain the predetermined orientation of the magnet array 54.

Figure 6:
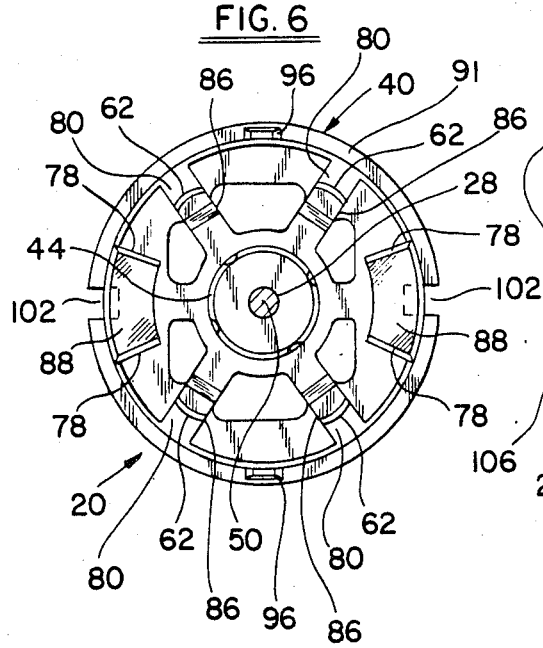
FIG. 6 is an elevational sectional detail view of the permanent magnet motor of the present invention, taken along line 6—6 of FIG. 2, and showing the pinion end cap subassembly.

The split wrapper 64 can also coact with the end caps 38, 40 and magnet array 54 to maintain the magnet array 54 in predetermined circumferential and axial orientations relative to the end caps 38, 40 and therefor to the armature 36, as well. With particular reference to FIGS. 3, 4 and 6, the end caps 38, 40 also include circumferential orientation surfaces 78 and axial orientation surfaces 80 which are engageable, respectively, with cooperating magnet circumferential and axial end faces 82, 84, as shown in particular in FIG. 3. The end cap orientation surfaces 62, 78, 80 are in turn formed on respective axial protrusions 86, 88, 90 extending axially inwardly from the end caps 38, 40. Here it should be noted that, as shown in FIG. 5, it is not an absolute necessity that the circumferential orientation surfaces 78 remain in engagement with the permanent magnet array 54, inasmuch as friction between the split wrapper 64 and respective outer surfaces 73, 75 of the permanent magnet segments 56, 58 maintains the predetermined circumferential orientation or alignment of the magnet segments 56, 58 relative to the armature 36 and/or each other. This eliminates any need for additional elements, such as spring clips, adhesives, fasteners, or protrusions formed on the inner surface of the wrapper, to maintain the orientation of the magnet array. It is similarly not a necessity that the magnet segments 56, 58 remain in engagement with end cap axial orientation surfaces 80.

Again referring to FIGS. 3, 4 and 6, the split wrapper 64 and end caps 38, 40 also include cooperating elements which provide means for connecting the wrapper to the end caps in circumferential and axial alignment, thereby also eliminating the need for fasteners. Referring particularly to FIG. 3, wrapper-engaging surfaces 91 formed on end caps 38, 40 engage the respective axial ends 92, 94 of the wrapper 64, the wrapper engaging surfaces lying in planes normal to the armature axis 50. As will be noted later, when the caps are connected to the split wrapper 64, this engagement automatically aligns the end cap bore axes (and thus the end cap bearing axes) coaxial with the armature axis 50. Again referring to FIG. 3, the end caps 38, 40 also include wrapper circumferential alignment surfaces 96 which cooperate with mating recesses 98 formed 180° apart in the ends 92, 94 of the split wrapper 64. This ensures, for example, that the wrapper split 66 is aligned with a neutral axis of the magnetic field to minimize electromagnetic losses.

The commutator end cap 38 of the present invention further includes means 97 for connecting the permanent magnet motor to a source of electrical energy, namely means for mounting the brush contacts 22, as shown in FIGS. 3 and 4. End cap 38 thus becomes a multi-function structure.

The wrapper 64 and end caps 38, 40 are connected via wrapper crimp tabs 100, which are crimped into mating cooperating crimp recesses 102 formed in the end caps 38, 40 after the motor elements have been assembled into position.

Accordingly, the present invention provides a permanent magnet motor which enhances the alignment of its respective motor elements, but which eliminates the extra costs associated with the extra clips, fasteners, adhesives, and the like, required in conventional permanent magnet motors.

Figure 7:
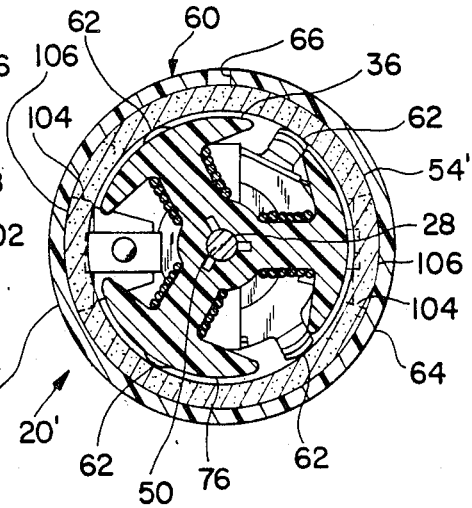
FIG. 7 is an elevational sectional detail view similar to FIG. 4, but showing an alternate embodiment of the permanent magnet motor of the present invention, in which the permanent magnet array is defined by a one-piece permanent magnet, and in which protrusions formed on the commutator end cap subassembly engage cooperating recesses formed in an outer surface of the permanent magnet, as shown in phantom.

Additional embodiments of the present invention are shown in FIGS. 7-12 and 14. In FIG. 7, the permanent magnet array 54' is defined by a single permanent magnet member extending 360° about the armature. In this embodiment, end cap protrusions 88 engage cooperating recesses 104 formed in the outer surface 106 of magnet array 54', as shown in phantom on the left and right portions of FIG. 7. Yet another embodiment of the motor of the present invention using a one-piece permanent magnet array is shown in FIGS. 10-12. Here the end cap protrusions include an annular ring 108 formed on end caps 110, 112 and engaging an inner surface 114 of a one-piece magnet array 54" to orient the array in predetermined relation to the armature axis 50. Circumferential locators 116 are formed on the ring 108 and engage cooperating recesses 118 formed in the magnet array 54". As shown in FIG. 12, split wrapper 60 cooperates with the magnet array 54" and end cap protrusions 108 and 116 to maintain the orientation of the array relative to the end caps 110, 112. Magnet elements defining the arrays in the embodiments shown in FIGS. 3, 7 and 10-12 can be formed, for example, of sintered barium ferrite, strontium ferrite or other suitable magnetic material, such as plastic molded magnetic compounds.

Still another embodiment of the permanent magnet motor of the present invention is shown in FIGS. 8 and 9, and addresses the need to maintain the orientation of magnet segments which are designed to accommodate armature coil windings 120 of higher slot build-up than those of the preceding embodiments. In this instance, magnet array 54''' is defined by a plurality of magnet segments 122 having end faces 124, 126 in which are formed respective recesses 128, 130, extending axially inwardly of the end faces. Protrusions 132, 134 formed on end caps 136, 138 cooperate with the respective recesses 128, 130 to establish a predetermined orientation, such as air gap 140, and split wrapper 60 cooperates with the magnet array 54''' and end cap protrusions 132, 134 to maintain the orientation. A magnet element 122 of the configuration shown in FIG. 8 can be formed by molding the element from plastic ferrite compound including, for example, strontium ferrite or barium ferrite, or from other suitable magnetic material.

Another feature of the permanent magnet motor of the present invention is that it eliminates the requirement present in conventional "can" motors for separate hardware to connect the motor to a housing member of an electrically-powered device. This condition is schematically shown in FIG. 13, in which a housing mounting bracket 142 is connected to a motor can 144 by fasteners 146.

An electrical device utilizing an embodiment of the permanent magnet motor which obviates this requirement is shown in FIG. 14 as a cordless drill/driver and is referred to generally as 148. The drill/driver 148 includes a permanent magnet motor 150 similar to that of the preceding embodiments of the present invention. The motor 150 is drivingly connected to an output member, such as a gear in a gear cluster (not shown) which is operatively associated with a housing member, such as a gear case 152, which in turn is connected to the drill/driver housing 154 by fasteners 156. The motor is electrically connected to batteries (not shown) contained in a handle 158 via switch 160 and brushes 162 (The various conductors having been omitted from FIG. 14 for clarity.). The motor 150 also includes an armature 164 journaled between two end caps 166, 168, a permanent magnet array 170 engaging the end caps, and spring means 172 for maintaining the end caps and magnet array in a predetermined orientation relative to the armature. The spring means 172 includes a split wrapper as shown in the previously-described embodiments of the present invention, and the permanent magnet array 170 is defined by "n" number of magnet elements, also similar to those previously described. As a result, when switch 160 is actuated, the motor 150 rotates a chuck 173 drivingly connected through the gear cluster.

As can be seen in FIG. 14, end cap 166 supports brushes 162, similar to the structure shown in FIG. 4. Accordingly, the end cap 166 is a unitary structure which includes first means for connecting the permanent magnet motor 150 to a source of electrical energy, similar to the brush contact mounting means 97 shown in FIGS. 3 and 4. End cap 168, on the other hand, includes structural features 170 formed integrally therewith and extending axially outwardly into nesting engagement with gear case 152. Accordingly, the end cap 168 can be a unitary structure combining motor element orientation features (as at 174) with second connection means for connecting the permanent magnet motor 150 to a housing member (as at 170), thus obviating the need for the bracket 142 and fasteners 146 shown in FIG. 13. Inasmuch as the structural features 170 locate the motor 150 in a predetermined orientation relative to gear case 152, and in view of the fact that such features 170 are located in a predetermined relationship to motor element orientation features 174, it can be seen that the spring means 172 of the present invention coacts to maintain the orientation of both the first and second connection means relative to each other and to the drill/driver 148. Further, the first and second connection means could optionally be formed integrally with the same end cap, depending upon factors including, but not limited to, the shape and location of switches, batteries, housing members, and drive train.

Figure 15:
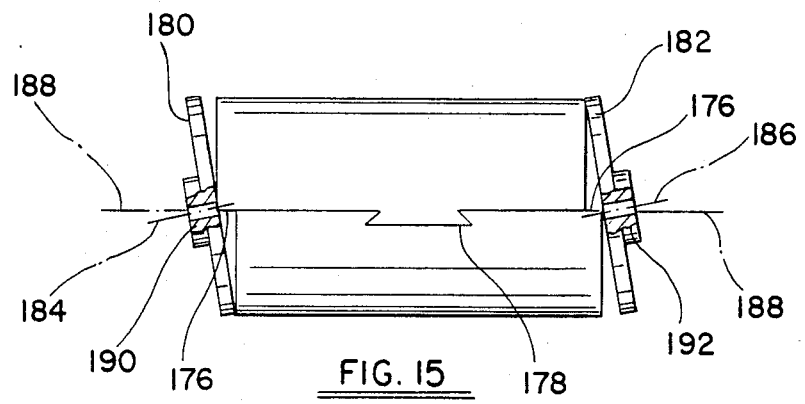
FIG. 15 is an elevational schematic detail view of a conventional open-ended wrapper formed with an axial misalignment, which causes skewing of the end cap bore axes relative to the armature axis.

FIG. 15 illustrates yet another problem overcome by the permanent magnet motor of the present invention. Frequently, the process of forming a rectangular strip of ferromagnetic material into a cylindrical open-ended wrapper generates a certain amount of axial misalignment at the junctions of two parallel edges of the rectangle, as shown in an exaggerated fashion at 176. Then, when the edges are subsequently connected in a conventional fashion, as by a dovetail joint 178, the axial misalignment 176 is frozen into place, skewing end caps 180, 182, and thereby misaligning their respective end cap bore axes 184, 186 relative to each other and to an armature axis 188. Consequently the end cap bearings 190, 192 are degraded relatively quickly by the armature (not shown), resulting in reduced motor life.

Figure 16:
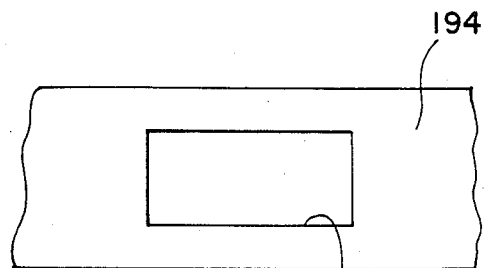
FIG. 16 is a detail plan view of a portion of ferromagnetic strip which is stamped in the shape of a rectangle having intersecting edges which have a high degree of perpendicularity, to produce the wrapper of the permanent magnet motor of the present invention.
Figures 17, 18:
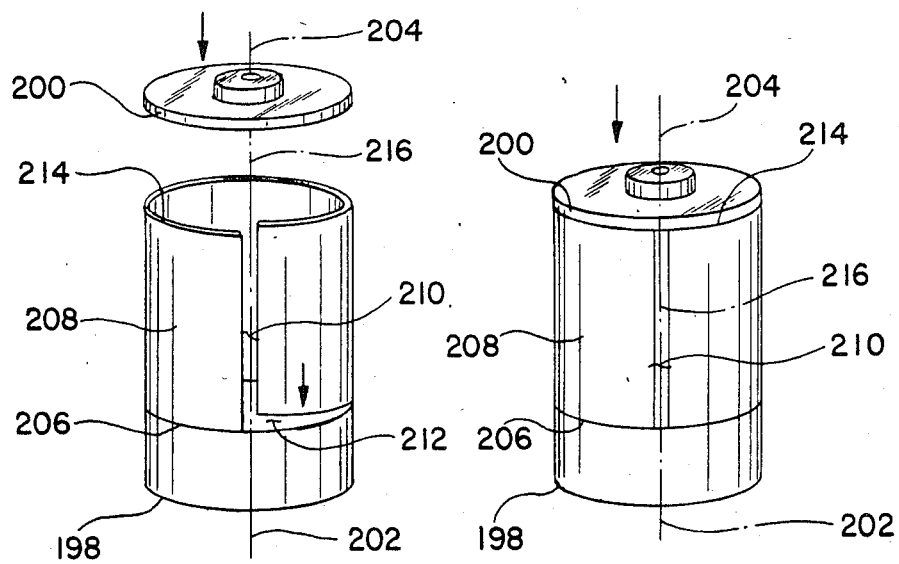
FIG. 17 is a schematic detail view of the split wrapper of the present invention, showing a similar axial misalignment after being formed into a cylinder.
FIG. 18 is a schematic detail view of the split wrapper shown in FIG. 17, in which the distance between the pinion end cap subassembly and the commutator end cap subassembly is closed until two parallel edges of the wrapper are axially aligned, thereby automatically coaxially aligning the end cap bore axes with each other, and with the armature axis.

The solution provided by the present invention first involves the step of forming the wrapper as a rectangle of sheet or strip ferromagnetic material. For the size of the applications described above, the rectangle is formed by stamping it from a sheet or strip of about 0.040" to 0.090" thick carbon steel, the hardness of the steel being selected by taking into consideration such factors as the desired spring qualities and the thickness of metal. One of the attributes of such a ferromagnetic wrapper is that it also provides a magnetic return path for the magnetic flux. Accordingly, inasmuch as this is dependent upon the cross-sectional area of the wrapper, the thickness and width of the rectangle should be selected so that the resultant cross-sectional area matches the desired flux flow. Further, the inner diameter of the resultant cylinder should be less in its free state than the cross-sectional dimension of the desired magnet array. FIG. 16 shows such a strip of steel 194 from which a rectangle 196 has been stamped. Referring for a moment to FIG. 3, one of the advantages (in addition to reduced cost) in forming the wrapper in this fashion is that such features as recesses 66 and crimp tabs 100 can be formed simultaneously with the rectangle 196. Referring again to FIG. 16, another advantage is that the rectangle 196 can be stamped using a punch and die set to hold the perpendicularity of respective intersecting rectangle edges to a high degree of accuracy. This automatically forces the axial ends of a cylinder formed from such a rectangle to lie in a plane which is equally accurately perpendicular to the cylinder axis. This concept, together with the split wrapper concept, provides a method for automatically aligning the two axial end cap bore axes. This is shown in FIGS. 17 and 18, in which first and second end caps 198, 200 define respective end cap bore axes 202, 204. One end 206 of cylinder or wrapper 208 defining a longitudinal split 210 is placed against the first end cap 198. (It should be noted at this point that the wrapper-engaging surfaces of the end caps used in the present magnet motor of the present invention should also lie in respective planes normal to the end cap bore axes.) As shown in FIG. 17, with the wrapper 208 in contact with the end cap 198, a small axial misalignment 212 may exist. However, because the edges of the wrapper defining the split 210 are not fixed together, as in the conventional joint 178 shown in FIG. 15, the misalignment 212 is not frozen, and the freedom of axial movement created by the split wrapper concept yields the following effect: when, as shown in FIG. 18, the second end cap 200 is then placed against the other end 214 of the wrapper 208, and subsequently is moved towards the first end cap 198 until the axial misalignment 212 is eliminated, or until the respective wrapper axial ends 206, 214 are made flush with the end cap wrapper-engaging surfaces, the end cap bore axes 202, 204 will automatically have been coaxially aligned. This will also result in the automatic coaxial alignment of the end cap bore axes 202, 204 with the armature axis 216. Of course, it is also important that any end cap bearings are assembled in such bores so that the bearing bore axes are coincident with the end cap bore axes 202, 204. These assembly steps are incorporated in the process of assembling the entire permanent magnet motor of the present invention, and are shown schematically in FIGS. 19A–19E.

Referring first to FIG. 19A, a suitable holding fixture 218 supports a first end cap subassembly 220, which includes a commutator end cap 222 similar to that of the above-described embodiments of the present invention. The end cap 222 has magnet-engaging surfaces 224 and wrapper-engaging surface 226, and defines a commutator end cap bore 228. The first end cap subassembly 220 further includes a commutator bearing 230 pressed into bore 228, and an armature subassembly 232 having an armature shaft 234 journaled for rotation in bearing 230 along an armature axis 236. As shown by arrows 238, a permanent magnet array 240 having a predetermined cross-sectional dimension or outer diameter and defined by magnet segments 242, 244 is located against the cooperating end cap surfaces 224 (similar to one or more protrusions 86, 88, 90 in FIG. 3) in a predetermined orientation relative to end cap subassembly 220. Then as shown in FIG. 19B a split ferromagnetic wrapper 246 formed as described above, so that its inner cross-section dimension in its free state is less than the magnet array outer diameter, is expended until the wrapper can be placed around the magnet array 240. Still referring to FIG. 19B, the split wrapper 246 is then placed around the magnet array 240 and against end cap surfaces 226, and is allowed to contract to urge the magnet array 240 against end cap surfaces 224 to maintain the predetermined orientation. The resultant structure is shown in FIG. 19C.

Figure 19E:
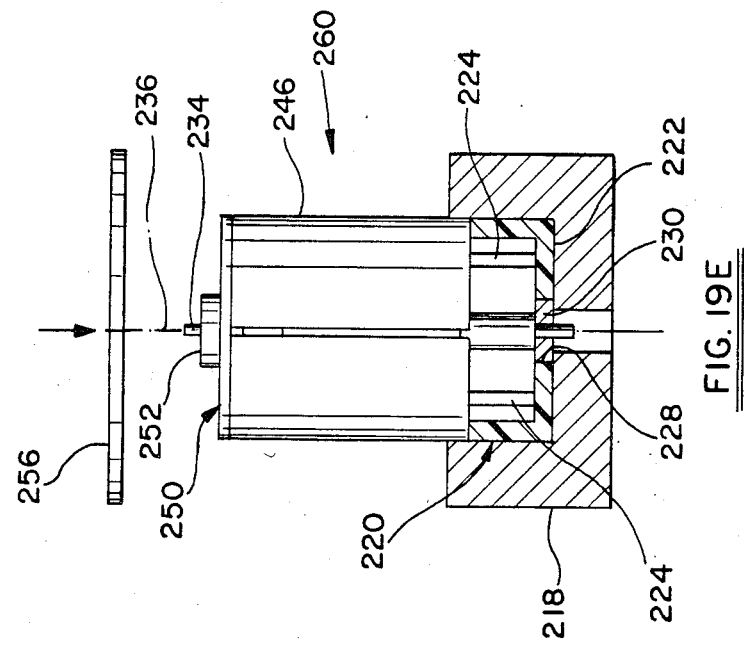
Figure 19D:
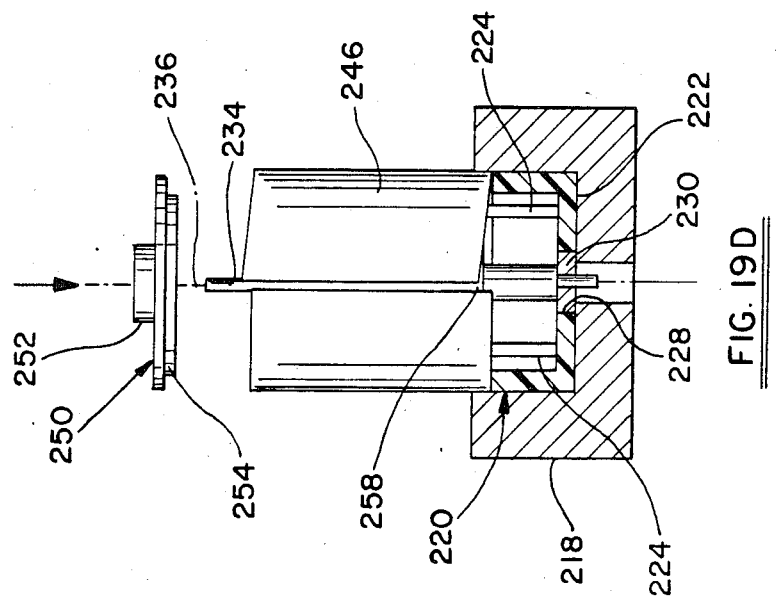

Still referring to FIG. 19C, one or more washers 248 are added as needed to the armature shaft 234 to reduce armature shaft end play. Then as shown in FIG. 19D a second end cap subassembly 250 including a pinion end cap 252 and a pinion end cap bearing pressed in a pinion end cap bore (not shown), is journaled on the armature shaft 234 adjacent the split wrapper 246 and magnet array 240. The second end cap subassembly 250 is then moved towards the first end cap subassembly 220 so that the wrapper 246 expands sufficiently to engage a cooperating surface 254 formed on pinion end cap 252, while still maintaining the predetermined orientation noted above. Referring now to FIG. 19E, the wrapper is connected to the first and second end cap subassemblies, for example, by crimping, as was discussed with respect to the crimp tabs 100 shown in FIG. 3. Then such motor elements as the permanent magnet segments 242, 244 are magnetized, as by using a suitable magnetizing ring 256.

These steps have also resulted in elimination of any wrapper axial misalignment, shown in an exaggerated fashion at 258 in FIGS. 19B, 19C and 19D, similar to the result achieved by the steps of the method of the present invention described in connection with FIGS. 17 and 18. The processes of the present invention have accordingly produced a permanent magnet motor 260 in which the alignment of various motor elements has been achieved with a high degree of accuracy and with savings in manufacturing costs.

None of the above-described embodiments are to be construed as limiting the breadth of the present invention. Modifications and other alternative constructions will be apparent which are within the scope of the invention as defined in the appended claims.

What is claimed is:

1. A permanent magnet motor for use in an electrically powered device, comprising:
   two axially spaced end caps defining respective end cap bores, said end caps having opposing surfaces that are parallel to one another when said bores are axially aligned, and further having radially outwardly facing support surfaces located a predetermined radial distance from the axes of said bores;
   an armature rotatably connected to said end caps via said end cap bores along an armature axis;
   a permanent magnet array disposed about said armature and having an inner radial surface, an outer radial surface, and axial end surfaces, said inner radial surface engaging said support surfaces of said end caps so as to define a predetermined air gap between said armature and said inner surface of said permanent magnet array; and
   spring means comprising a one-piece longitudinally split tubular ferromagnetic wrapper connecting said two end caps and engaging said outer radial surface of said permanent magnet array for biasing said inner radial surface of said permanent magnet array against said support surfaces of said end caps.

2. A permanent magnet motor comprising:
   two axially spaced end caps defining respective end cap bores, said end caps having opposing surfaces that are parallel to one another when said bores are axially aligned;
   an armature rotatably connected to said end caps via said end cap bores along an armature axis;
   a permanent magnet array disposed about said armature and engaging said end caps; and
   means connecting said end caps and including spring means comprising a one-piece tubular wrapper with a longitudinal split operatively engaged with said permanent magnet array to bias said permanent magnet array into engagement with said end caps; said wrapper having axial ends defining parallel planes normal to said armature axis and engaging said opposing surfaces of said end caps so as to insure alignment of said end cap bores with said armature axis.

3. The permanent magnet motor claimed in claim 1, wherein:
   (a) said end cap support surfaces are located on a first plurality of protrusions extending axially inwardly of said end caps; and
   (b) said wrapper urges said permanent magnet array against the support surfaces of said protrusions.

4. The permanent magnet motor claimed in claim 3, wherein:
   (a) said permanent magnet array comprises a plurality of permanent magnet segments having circumferential end faces; and
   (b) said end caps include a second plurality of protrusions extending axially inwardly of said end caps into cooperating recesses formed between said magnet segment circumferential end faces.

5. The permanent magnet motor claimed in claim 1, wherein said split wrapper has a cylindrical cross-section and an inner surface essentially free of interruptions.

6. A permanent magnet motor for use in an electrically powered device, comprising:
   two axially spaced end caps defining respective end cap bores, said end caps having opposing surfaces that are parallel to one another when said bores are axially aligned, and further having radially outwardly facing support surfaces located a predetermined radial distance from the axes of said bores;
   an armature rotatably connected to said end caps via said end cap bores along an armature axis;
   a permanent magnet array disposed about said armature and having an inner radial surface, an outer radial surface, and axial end surfaces, said inner radial surface engaging said support surfaces of said end caps so as to define a predetermined air gap between said armature and said inner surface of said permanent magnet array; at least one of said axial end surfaces of said permanent magnet array being spaced from said opposing surfaces of said end caps; and
   means connecting said two end caps and including spring means comprising a one-piece tubular ferromagnetic wrapper with a longitudinal split engaging said outer radial surface of said permanent magnet array, and having an internal cross-sectional dimension that is normally less in its free state than the cross-sectional dimension of said permanent magnet array is biased against said support surfaces of said end caps; the axial ends of said wrapper defining parallel planes normal to said armature axis and engaging said opposing surfaces of said end caps so as to insure that said end cap bores are axially aligned with said armature axis.

7. An electrically operated device, comprising:
   a housing member;
   an output member operatively associated with said housing member;
   a permanent magnet motor including an armature drivingly connected to said output member and journaled between two end caps having radially outwardly facing support surfaces located a predetermined radial distance from the axis of the armature;
   a permanent magnet array disposed about said armature and having an inner radial surface, an outer radial surface, and axial end surfaces, said inner radial surface engaging said support surfaces of said end caps so as to define a predetermined air gap between said armature and said inner surface of said permanent magnet array; and said end caps; and spring means comprising a one-piece longitudinally split tubular ferromagnetic wrapper connecting said two end caps and engaging said outer radial surface of said permanent magnet array for biasing said inner radial surface of said permanent magnet array against said support surfaces of said end caps.

8. The permanent magnet motor claimed in claim 1, wherein said electrically-powered device is a hand-held portable vacuum cleaner.

9. The permanent magnet motor claimed in claim 2, wherein:
    (a) said split wrapper comprises an open-ended cylinder formed from a rectangle of stamped sheet metal such that said split extends the length of said cylinder; and
    (b) said split wrapper is sandwiched between said end cap opposing surfaces such that said wrapper axial ends lie in respective planes normal to said respective end cap bore axes.

10. The permanent magnet motor claimed in claim 2, wherein said split wrapper further maintains said permanent magnet array in a predetermined circumferential orientation relative to at least one of said end caps.

11. The permanent magnet motor claimed in claim 2, wherein:
    (a) said permanent magnet array comprises a single permanent magnet member having an inner surface and an outer surface; and
    (b) each of said end caps includes a protrusion engaging a cooperating recess formed in at least one of said inner surface and outer surface.

12. The electrically-powered device claimed in claim 7, further comprising:
    (a) first connection means for connecting said permanent magnet motor to a source of electrical energy;
    (b) second connection means for connecting said permanent magnet motor to said housing member; and wherein
    (c) at least one of said end caps is formed as a unitary structure integral with at least one of said first and second connection means.

13. The electrically-powered device claimed in claim 12, wherein:
    (a) one of said end caps is formed as a unitary structure with said first connection means; and
    (b) the other of said end caps is formed as a unitary structure integral with said second connection means.

14. The electrically-powered device claimed in claim 13, wherein:
    (a) said electrical device is a battery-powered portable power tool;
    (b) said housing member is a gear case mounted in said power tool;
    (c) said first connection means includes means for mounting contacts selectively electrically connectable to said battery; and
    (d) said second connection means is engageable with a cooperating surface formed on said gear case.

* * * * *